United States Patent [19]
Schenk

[11] 3,930,737
[45] Jan. 6, 1976

[54] STUD ASSEMBLY
[75] Inventor: Peter Schenk, West Islip, N.Y.
[73] Assignee: Dzus Fastener Co., Inc., West Islip, N.Y.
[22] Filed: Aug. 19, 1974
[21] Appl. No.: 498,514

Related U.S. Application Data
[62] Division of Ser. No. 412,707, Nov. 5, 1973, Pat. No. 3,874,065.

[52] U.S. Cl. ............................... 403/354; 403/241
[51] Int. Cl.² .......................................... F16B 2/00
[58] Field of Search .......... 403/241, 354, 355, 274; 29/520

[56] References Cited
UNITED STATES PATENTS
| | | | |
|---|---|---|---|
| 2,078,212 | 4/1937 | Leighton | 29/520 X |
| 2,183,824 | 12/1939 | Smith | 403/354 |
| 2,253,831 | 8/1941 | Wantz | 403/354 X |
| 2,349,677 | 5/1944 | Reynolds | 29/520 |

Primary Examiner—Andrew V. Kundrat
Attorney, Agent, or Firm—Kane, Dalsimer, Kane, Sullivan and Kurucz

[57] ABSTRACT

A stud assembly produced by holding in fixed position a head portion having a gripping surface extending from a base. A deformable washer is then extended over the base. A stud member is provided with a receptacle end portion and positioned with respect to the base of the head so that interengaging and cooperating surfaces on the receptacle and base are aligned and provide locking apertures for receiving the washer. Finally, the washer is deformed so that it extends into the locking apertures thereby locking the stud member to the head and forming a unitary stud assembly.

1 Claim, 8 Drawing Figures

FIG. 6
FIG. 7
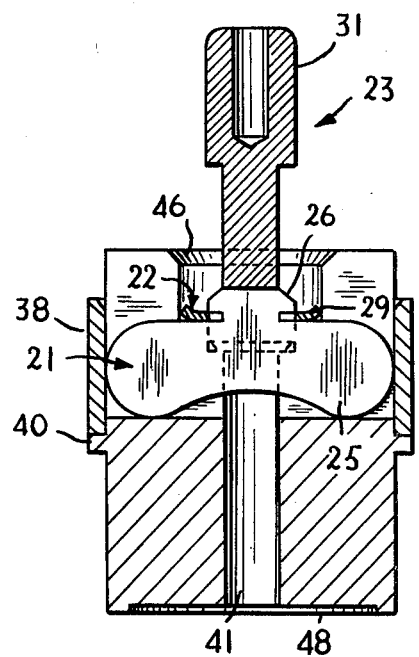
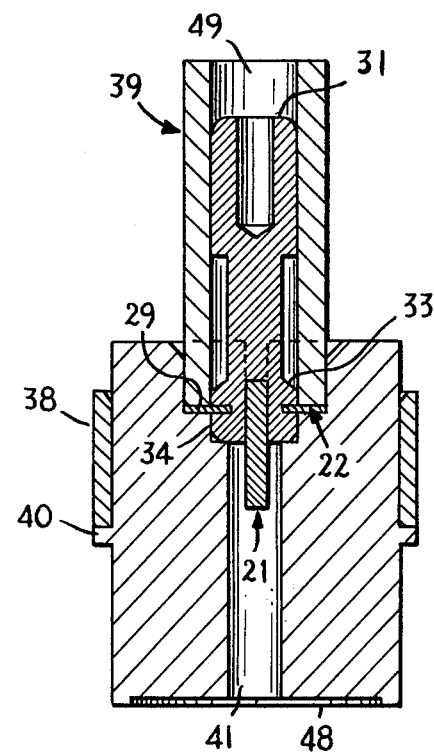
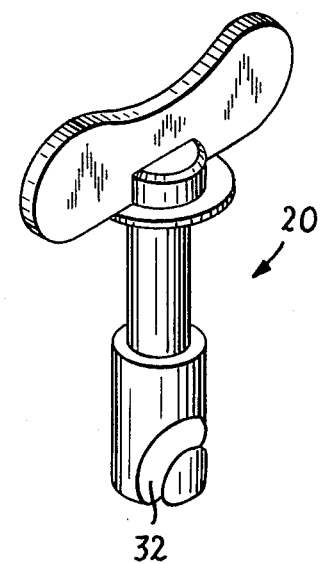
FIG. 8

3,930,737

STUD ASSEMBLY

This application is a diversional application of Ser. No. 412,707 filed Nov. 5, 1973, and now U.S. Pat. No. 3,874,065.

BACKGROUND OF THE INVENTION

In many fastener arrangements it is desirable to use an elongated stud member having a wing type head portion. This design arrangement presents obvious manufacturing difficulties. With the unusual shape of the head rather complex and difficult machining processes would be necessary in order to make a one-piece fastener element. In contrast, there is no known successful means for manufacturing a low-cost multicomponent stud design to accommodate the wing head design.

It should also be kept in mind that working with extremely elongated stud members presents increased manufacturing difficulties when a wing head design is to be employed therewith. Once again machining of such a member is extremely costly and, additionally, well known methods for constructing a multi-piece unit would be prohibitive from a cost and efficiency standpoint.

Consequently, it is readily apparent that a stud assembly having an elongated stud member and a wing head portion which can be efficiently manufactured at low cost would be extremely advantageous to the fastener art.

SUMMARY OF THE INVENTION

With the above background in mind, it is a primary objective of the present invention to provide a multi-piece stud assembly which is quick and easy to manufacture and assemble, is of low cost and incorporates members which are positively interengaged to prevent disassembly. The stud assembly is adaptable for use with many types of stud configurations and is particularly designed to be adaptable for use with elongated studs which require a winged head.

In summary, the stud assembly is produced by holding in fixed position a head portion having a gripping surface extending from a base portion. A deformable washer is extended over the base and a stud member is provided with a receptacle end portion which is positioned with respect to the base so that interengaging and cooperating surfaces on the receptacle and base are aligned and provide locking apertures for receiving the washer. Finally, the washer is deformed so that it extends into the locking apertures thereby locking the stud member to the head and forming a unitary stud assembly.

With the above objects, among others, in mind reference is had to the attached drawings.

BRIEF DESCRIPTION OF THE DRAWINGS

In the drawings:

FIG. 6 is a sectional elevation view thereof in the same plane as the sections of FIGS. 2 and 4 and showing the stud member, washer and wing head in position in the holding jig for final interengagement;

FIG. 7 is a sectional elevation view thereof along the same plane as the planes of FIGS. 3 and 5 and showing a plunger interengaging with the washer so as to deform the washer and complete formation of the unitary stud assembly of the invention; and FIG. 8 is a perspective view of a stud assembly of the invention.

DESCRIPTION OF THE PREFERRED EMBODIMENT

Figure 1:
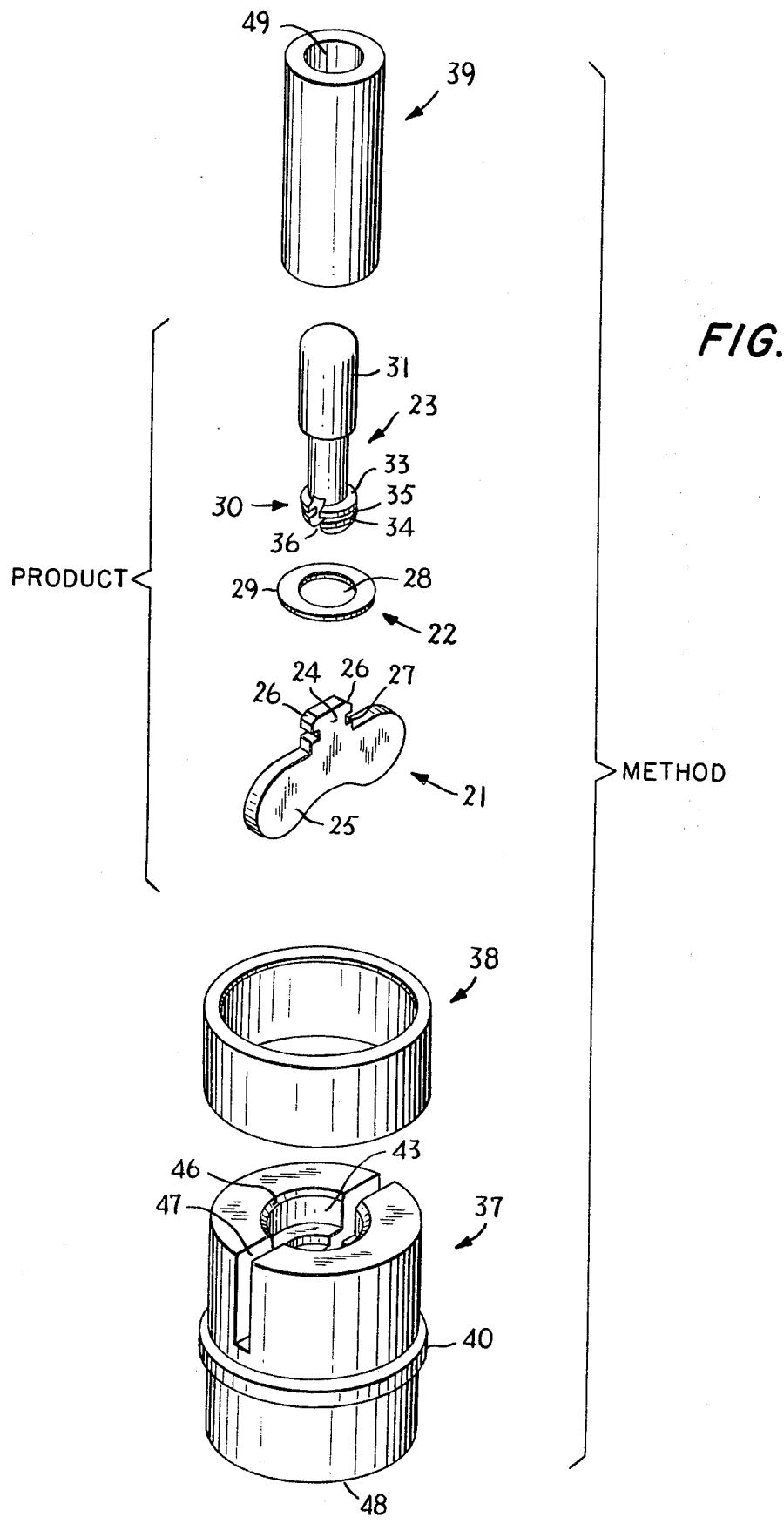
FIG. 1 is an exploded perspective view of the stud assembly of the invention.

Stud assembly 20 as shown in assembled form in FIG. 8. The components of stud assembly 20 are shown prior to assembly in FIG. 1. They include a head 21, a washer 22 and a stud member 23. Materials for the components are of readily available conventional material which is used for fasteners such as steel. It is preferable that washer 22 be deformable in nature so as to achieve the proper fastening interengagement between components.

The head 21 includes a generally rectangular shaped base 24 and a pair of wings extending from one end of the base and laterally therefrom so as to form a gripping surface 25 for the stud assembly. Base 24 has a beveled end portion 26 distal from the wing gripping portion 25 so as to facilitate assembly of head 21 with the remaining components of the assembly. Intermediate the ends of head 24 is a pair of opposing notches 27 which form locking recesses for interengagement of the components. Preferably, a notch 27 is provided on each of the two shorter sides of the base portion 24, however, it is readily apparent that the configuration of base 24 can be readily altered as well as the number, configuration and placement of the notches 27.

Washer 22 in unassembled position is flat in the portion adjacent to the opening 28 in its center and is curved or arcuate in its outer portion 29.

Stud member 23 includes a receptacle and portion 30 for interengagement with washer 22 and head 21 and a shank portion 31. As shown, shank portion 31 is generally cylindrical in configuration with a larger diameter portion distal from receptacle portion 30 than the portion of stud 31 therebetween. Additionally, as shown in FIG. 8, the larger portion of shank 31 includes a cam slot 32 therein for interengagement with a receptacle for the entire stud assembly.

The receptacle portion 30 of stud member 23 includes a pair of spaced annular shoulders 33 and 34 projecting laterally from stud member 23. The space therebetween forms a circular groove 35. A lateral slot 36 cut diametrically with respect to stud member 23 extends through receptacle portion 30 so as to be open at the engaging end of receptacle portion 30 and on opposing sides of the receptacle portion. Slot 36 is designed so as to receive base 24 therein.

In actual assembly, washer 22 is extended over head 21 with base 24 passing through opening 28 in the washer. Stud 23 is then pushed through opening 28 in the washer and base 24 is received in slot 36 of receptacle portion 30. The stud, washer and base are then aligned so that washer 28 is in alignment with annular groove 35 and locking recesses 27. The washer is then flattened and being deformable will extend into groove 35 and locking recesses 27 and remain therein thereby locking stud 23 and head 21 together. In this manner, a stud assembly with a wing head is formed of component parts which are rigidly and positively interlocked.

Figure 2:
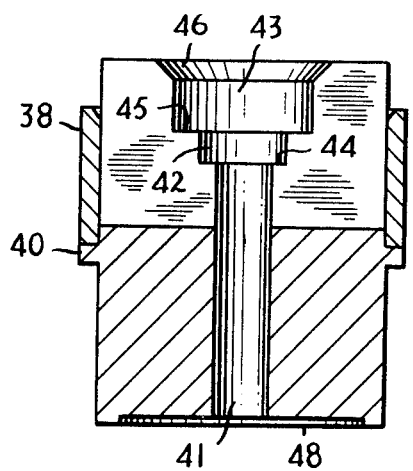
FIG. 2 is a sectional elevation view of a holding jig arrangement designed to facilitate the assembly of the stud assembly of the invention.
Figure 3:
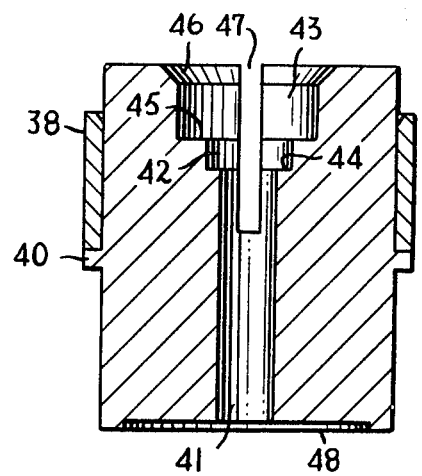
FIG. 3 is a sectional elevation view thereof with the plane of the section being 90° out of phase with the plane of the sectional view of FIG. 2.

To facilitate manufacture of the stud assembly 20, appropriate jigs and assembly mechanisms can be employed as depicted. As shown in FIG. 1, the assembling structure includes a holding jig 37, a locking ring 38, and a plunger 39. Holding jig 37 includes appropriate recesses to receive the components and to cooperate with plunger 39 to interlock the components in the sequence depicted in FIGS. 4-7 to arrive at a completed stud assembly 20 as depicted in FIG. 8. FIGS. 2 and 3 depict the details of the holding jig 37 with the appropriate recesses to receive the component parts. Jig 37 is generally cylindrical in configuration and includes an annular shoulder 40 intermediate its ends extending from its outer surface. A central bore 41 terminates at its upper end in stepped portions of larger diameter to accommodate the various components. In sequence, smaller bore 41 opens into enlarged intermediate bore portion 42 which in turn opens into a larger upper bore portion 43. The enlargement of the central bore forms a pair of annular shoulders 44 and 45 which serve as stop means for parts during the assembly process. The upper end of larger central bore portion 43 terminates in a beveled rim 46 which facilitates insertion of parts into the various diameter portions of 41, 42 and 43 of the central bore. A rectangular diametrically located slot 47 extends across the width of holding jig 37 and is cut deep enough so as to extend through portions 41, 42 and 43 of the central bore. Slot 47 is open at the top and is wide enough to receive the winged portion of head 21 which forms gripping surface 25.

Figure 4:
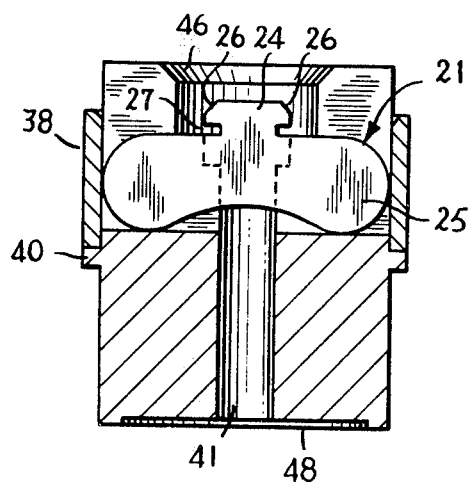
FIG. 4 is a sectional elevation view thereof taken along the same plane as FIG. 2 and showing the wing head portion in position in the holding jig.
Figure 5:
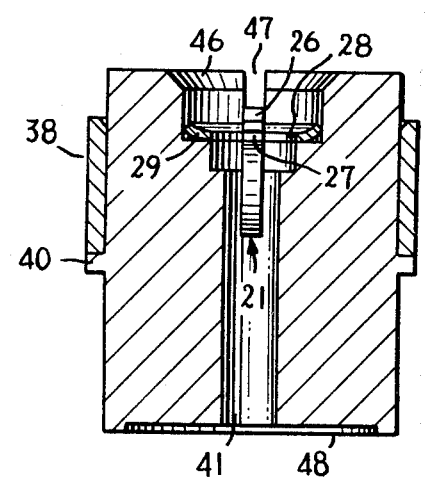
FIG. 5 is a sectional elevation view thereof in the same plane as the plane of the section view of FIG. 3 and showing the washer in position in the holding jig along with the wing head.

The initial assembly step as depicted in FIG. 4 includes positioning head 21 so that it is located in slot 47 and is entirely within holding jig 37. The locking ring 38 which is of slightly larger inner diameter than the outer diameter of holding jig 37 is then slid onto the upper portion thereof so that its lower surface is in interengagement with the upper surface of annular shoulder 40. The locking ring 38 then closes the openings at the edges of slot 47 and fixes the position of the wing head therein from a lateral standpoint. The bottom of the wing head rests against the bottom of slot 47. Base portion 24 is located approximately centrally with respect to the central bore in position to receive the further components. Deformable washer 22 is then inserted into the central bore until it rests on shoulder 45 where it is in lateral alignment with notches 27 in head 21. The flat portion of washer 22 rests on the shoulder while the arcuate outer portion 29 is spaced from the shoulder as shown in FIG. 5.

Thereafter, stud member 23 is inserted into the central bore until the undersurface of receptacle portion 30 comes into engagement with shoulder 44. This position is depicted in FIG. 6 and brings groove 35 into alignment with the inner edge of washer 22 and locking notches or recesses 27. Alignment of slot 36 with respect to base 24 permits reception of the base within the slot. The slot 36 having a slightly greater diameter than the outer diameter of base 24.

With the components of stud assembly 20 in that position, as shown in FIG. 7, plunger 39 having a central bore 49 therethrough is then utilized to complete the assembly operation. Bore 49 is of slightly larger diameter than the largest outer diameter of shank 31 of stud member 23. This permits plunger 39 to be extended over the shank 31 of the stud member which serves as a guide for facilitating the accurate lowering of the plunger into proper position within holding jig 37.

Plunger 39 is lowered as guided by shank 31 until it enters the central bore of the holding jig and comes into engagement with the upper surface of washer 22. Continued downward pressure of plunger 39 causes the washer to deform and be displaced in the only possible direction which is into groove 35 and locking notches or recesses 27. Sufficient pressure is utilized by means of plunger 39 so as to flatten washer 22 as shown in FIG. 7. The deformed washer will remain in the flattened position when the plunger is removed thereby retaining the head 21 and stud 23 in locked position with respect to one another and forming the unitary stud assembly 20.

Removal of complete assembly 20 from holding jig 37 is facilitated by the presence of an opening 48 in the underside of the holding jig which permits access to the bottom end of bore 41. An appropriate tool can be inserted through opening 41 and up through bore 41 into engagement with assembly 20 and forcing assembly 20 out from the upper end of holding jig 37. The resultant product is depicted in FIG. 8 after removal from the jig.

Thus, the above objectives of the present invention, among others, are effectively attained.

I claim:
1. A stud assembly comprising:
    a head portion having opposing gripping surfaces extending from a base with at least one locking recess therein;
    a stud member with a receptacle end portion having a slot therein and a circumferential groove adjacent the edge thereof;
    the stud member positioned so that the base of the head portion is located in the slot and the circumferential groove is aligned with the recess;
    a deformable washer in deformed condition so as to extend into the groove and slot of the stud and the locking recess of the head thereby locking the stud member to the head and forming a unitary stud assembly;
    the stud member being substantially cylindrical in configuration; and
    the receptacle end portion including the slot having a pair of spaced annular rings extending laterally therefrom with the spaced therebetween forming the circumferential groove and the slot extending through the rings.

* * * * *